US005710040A

United States Patent [19]

Christner et al.

[11] Patent Number: 5,710,040

[45] Date of Patent: Jan. 20, 1998

[54] STABLE ENZYMATIC AQUEOUS LIQUID COMPOSITION FOR THE PRODUCTION OF LEATHER

[75] Inventors: Juergen Christner, Seeheim-Jugenheim; Gertrud Wick, Darmstadt, both of Germany

[73] Assignee: Roehm GmbH Chemische Fabrik, Darmstadt, Germany

[21] Appl. No.: 600,735

[22] Filed: Feb. 13, 1996

[30] Foreign Application Priority Data

Feb. 24, 1995 [DE] Germany ........................ 295 03 135 U

[51] Int. Cl.[6] ........................ C12S 7/00

[52] U.S. Cl. ........................ 435/265; 435/188; 8/94.15

[58] Field of Search ........................ 435/188, 265, 435/207, 198, 219, 220, 221; 8/94.1 R, 94.16, 94.15; 424/94.3, 94.6

[56] References Cited

U.S. PATENT DOCUMENTS

| | | | |
|---|---|---|---|
| 1,599,930 | 9/1926 | Takamine et al. | 435/188 |
| 1,820,957 | 9/1931 | Wallerstein | 435/188 |
| 1,855,592 | 4/1932 | Wallerstein | 435/188 |
| 2,556,649 | 6/1951 | Heinemann . | |
| 3,635,797 | 1/1972 | Battistoni et al. . | |
| 4,675,296 | 6/1987 | Lehmussaari et al. | 435/188 |
| 4,943,530 | 7/1990 | Christner et al. | 435/265 |
| 5,089,414 | 2/1992 | Christner et al. | 435/265 |
| 5,102,422 | 4/1992 | Christner et al. | 435/265 |
| 5,525,509 | 6/1996 | Christner et al. | 435/265 |

FOREIGN PATENT DOCUMENTS

| | | | |
|---|---|---|---|
| 0 505 920 | 9/1992 | European Pat. Off. . | |
| 55-34001 | 3/1980 | Japan | 435/188 |
| 3-4790 | 1/1991 | Japan | 435/188 |

*Primary Examiner*—William H. Beisner

*Attorney, Agent, or Firm*—Oblon, Spivak, McClelland, Maier & Neustadt, P.C.

[57] ABSTRACT

An aqueous liquid composition containing one or more enzymatic active substances and at least 10 wt % to a maximum of (100–x) wt % molasses, wherein x is the fraction of enzymatic active substances in wt % and wherein x is a value from 0.001 to 90, which is useful for the production of leather in the beamhouse, to improve rehydration and dirt removal while soaking, to improve the loosening of hair and to inhibit swelling during liming, and to improve the cleaning of the surface of the skin during bating.

21 Claims, No Drawings

STABLE ENZYMATIC AQUEOUS LIQUID COMPOSITION FOR THE PRODUCTION OF LEATHER

BACKGROUND OF THE INVENTION

1. Field of the Invention

The present invention relates to a stable, aqueous liquid for the production of leather in the beamhouse, in the form of a combination preparation which is useful to improve rehydration and dirt removal while soaking; to improve the loosening of hair and to inhibit swelling during liming; and to improve the cleaning of the surface of the skin during bating.

2. Discussion of the Background

Many of the processes used in the production of leather in a beamhouse, such as soaking, liming, and bating, which are all used to prepare for tanning, require a large number of treatment steps with varying additions of reagents and additives to the bath. Enzymes, hydrotropes, surfactants, swelling-inhibitors, lime-dispersants, and hair-looseners are added. As a rule, they are added individually. Various reagents are not normally combined in one agent. This is true, in particular, for the use of enzymes in the beamhouse: enzymes are mostly used as individual preparations. Combination preparations, which combine enzymatic functions with other functions in one preparation, have not found acceptance in industrial practice.

Enzymatic processes are preferred today in various technological fields as prototypes of a "soft technology". Thus, enzymatic processes have been tried not only in the leather industry, but also in the detergent industry and in the production of fodder and foodstuffs. A quantitative and qualitative expansion is generally desired. The present-day status and future perspectives of enzyme technology are described in Ullmann, Encyclopedia of Industrial Chemistry, 5th Ed., Vol. A15, VCH (1990), pp. 390–434.

For the use of enzymes in leather processing, particularly in the beamhouse, there is an abundant state of the art. The purposeful use of enzymes in the production of leather began with the introduction of the enzymatic bate by Dr. Otto Rdhm in the year 1907 (German Patent No. 200,519). Since that time, given a background of increasing ecological awareness, the use of proteases in various partial operations in the beamhouse has been proposed and implemented in actual practice (see E. Pfleiderer and R. Reiner in Biotechnology, H.-J. Rehm, Ed., Vol. 6b, pp. 729–743, VCH 1988).

Proteolytic enzymes

Proteolytic enzymes are used in soaking, in liming, and in bating.

Soaking

The skins are delivered dry and must be rehydrated (softened up) for further treatment, precleaned, and degreased. Proteolytic enzymes are helpful in these operations in the following manner:

1. Albumins and globulins of blood residues are hydrolyzed and removed from the surface.

2. Proteoglycans, which sheath the collagen fibers, are also removed.

3. In this way, the uppermost skin layer (epidermis) becomes more permeable, allowing water and added surfactants to penetrate quickly and deeply. The surfactants thus reach their site of action quickly, which leads to good degreasing.

The action of the enzymes is recognized in that the skin is more quickly rehydrated and more completely degreased and, after soaking, is smoother, cleaner, and softer.

The liming process

The removal of hair by using strong alkalis ("liming") and reducing agents, such as sulfides, subsequently takes place. The use of proteases supports the loosening of the hair and improves the smoothness and cleanliness of the limed skin. Neutralization ("deliming") is carried out with organic acids.

Bating

This treatment step includes an intensive surface cleaning and should also provide good softness and elasticity. Here, enzymes fulfill the following functions:

1. Non-leather-forming proteins are cleaned away; residues of hair roots and grease are removed.

2. Elastin in scars is partially degraded increasing the degree of softness.

3. The collagen structure is slightly loosened by cleavage in the telopeptide area of the fibers. The leather becomes soft and exhibits improved skin loosening.

The skins and hides are now ready for further treatment. Tanning normally follows as the next step. The clean and defect-free surface, produced by a successful soaking and bating, also permits uniform dyeing.

The proteinases used in the above processes in the beamhouse are neutral (E.C.3.4.24) and, in particular, alkaline proteases (E.C.3.4.21) (see Kirk-Othmer, 3rd Ed., pp. 199–202, J. Wiley 1990; Ullmann's Encyclopedia of Industrial Chemistry, 5th Ed., Vol. A9, pp. 409–414, VCH 1987; L. Keay in "Process Biochemistry," pp. 17–21 (1971)). Individually, these are alkaline Bacillus proteases, which develop their optimum activity in the pH range from 8.5 to 13. Most belong to the serine type, and alkaline fungal proteases.

One can mention, above all, the proteases from Bacillus strains, such as *B. subtilis. B. licheniformis, B. firmus, B. alcalophilus, B. polymixa, B. mesentericus*, and Streptomyces strains, such as *S. alcalophilus*. The most favorable working temperatures for alkaline bacterial proteases generally lie at 40°–60° C. and with fungal proteases at 20°–40° C. The following can be mentioned as fungal proteases: those from Aspergillus strains, such as A. ox-yzae, from Penicillium strains, such as *P. cyanofulvum*, or from *Paecilomyces persicinus*, and the like. The activity of the alkaline fungal proteases lies predominantly in the pH range of 8.0–11.0. Neutral proteases with an optimum activity in the range of pH from 6.0–9.0 can also be used, even if they are less effective in the highly alkaline range. Among these are neutral bacterial proteases, belonging generally to the metalloenzymes, including neutral Bacillus proteases, such as *B. subtilis, B. licheniformis, B. natto*, and *B. polymixa*; Pseudomonas proteases; Streptomyces proteases; fungal proteases, such as Aspergillus proteases from *A. oryzae, A. parasiticus*; and Penicillium proteinases, such as *P. glaucum*. Neutral bacterial proteases develop their optimal activity at working temperatures of 20°–50° C., whereas the most favorable working temperature for neutral fungal proteases lies at 35°–40° C. The proteolytic effectiveness of the enzymes is usually determined according to the Anson hemoglobin method (M. L. Anson, J. Gen. Physiol., 22, pp. 79 ff., 1939) or according to the Loehlein-Volhard method (modified according to TEGEWA in Leder, 22, pp. 121–126, 1971). A Loehlein-Volhard unit (LVE) under the test conditions (1 h, 37° C., pH =8.3) thereby corresponds to an enzyme quantity which, in 20 mL of casein filtrate, produces an increase in hydrolysis product corresponding to an equivalent of $5.75\times10^{-3}$ mL 0.1N NaOH.

Other enzymes and enzyme combinations

The pancreatic enzyme complex introduced into leather technology by Dr. Otto Röhm is regarded as an enzyme combination preparation, for it already contains several enzymatic activities, including amylases, lipases, endo- and exoproteinases, wherein, of course, the tryptic activity of the latter predominates in actual use.

Amylases, particularly in combination with proteases, have gained acceptance in the bating process of the beamhouse (U.S. patent application No. A 4,273,876). The simultaneous use of lipase and amylase (in the form of pancreatin) in the presence of desoxycholic acid is known from Hungarian Patent No. 3,325 (Chem. Abstr. 77, 7341 k). In more recent times, an enzymatically supported soaking process for skins and hides has been recommended, in which the soaking baths contain lipases with an optimum activity in the pH range of 9–11, proteases with effectiveness in the pH range of 9–11, and surface-active agents, wherein the pH value of the soaking bath lies in the range of 9–11 (see German Patent Application No. P 3922748.0). Accordingly, lipases are also effective. Strains obtained from Aspergillus species and especially certain genetically modified strains have been found to be particularly effective, such as an alkaline lipase from an *Aspergillus oryzae* strain, obtained by recombination, with a pronounced optimum activity between pH 9 and 11 (described in U.S. Pat. No. 5,082,585). It corresponds to the lipase (NOVO INDUSTRI A/S, DK 2880 Bagsvaerd) found on the market under the name "LIPOLASE 100 T$^R$." Other lipases which can be taken into consideration originate, for example, in Rizopus, such as *Rh. javanicus*; in Mucor, such as *M. mihei* or *M. javanicus*; in Pseudomonas, such as *Ps. fluorescens*; or in *Aspergillus niger.*

Traditionally, the activity determination of lipases is carried out with triacetin and tributyrin as the substrate (see M. Semeriva et al., Biochemistry, 10, pp. 2143 ff., 1971); also with olive oil (see Bruno Stellmach, Determination methods, enzymes for pharmacy, food chemistry, technology, biochemistry, biology, medicine, Steinkopf Verlag, 1988, pp. 169 ff.: Lipase according to FIP, unit=FIP/g). If the lipolytic activity in the acid is to be measured, it is analyzed with tributyrin as the substrate (unit=LCA/g). Standard conditions are 40° C., pH=5.5 (see M. Sémériva, reference cited above). For the purposes of the present invention, the lipase activity is predominantly indicated according to FIP (FIP/g), wherein the measurement is carried out at pH 9.0 and 37° C. In German Patent No. A 4,109,826, the principle of the simultaneous use of proteinases and lipases is used in the alkaline pH range on the partial operations of liming and bating. Here, too, it is precisely the combination of the two activities which is particularly effective. The two enzymes are added individually; a finished combination preparation which combines both activities is not described for understandable reasons, but a "cannibalizing" of the enzymes must be expected in such a combination.

The use of molasses

The use of molasses in leather processing is known. Molasses can be added in small concentrations in all operations in the beamhouse. Its addition during deliming is particularly effective, since it clearly improves the solubility of the lime hydrate in the bath and thus promotes the complete removal of lime residues. *Bibliothek des Leders* [*Library of Leather*], Volume 2, edited by H. Herfeld (1989), p. 115, states that almost four times as much lime is dissolved in a 1% sugar solution as in pure water.

The use of hydrotropes in leather processing

"Hydrotropy" is understood to mean the phenomenon wherein a hard to dissolve substance becomes water-soluble in the presence of a second compound, which is itself not a solvent. Substances which bring about such a solubility improvement are designated as hydrotropes. They act as solubility imparters with different mechanisms of action. Accordingly, their chemical composition is quite different. F. Stather, *Gerbereichemie und Gerbereitechnologie* [*Tanning Chemistry and Tanning Technology*], Akademieverlag Berlin (1951), pp. 70 and 71, distinguishes between nonelectrolytes and electrolytes. Among the former are organic amino compounds, such as urea, thiourea, formamide, acetamide, and so forth. Among the latter are sulfonic acids and carboxylic acids of the aromatic series, but also of the aliphatic series, particularly their salts. Also inorganic neutral salts, such as thiocyanates or also calcium chloride, have, in accordance with their position in the Hoffmeister series, a hydrotropic effect. In proteins, such as the collagen structure of the skin, hydrotropes bring about a cleavage of the hydrogen bonds between the peptide chains and thus a swelling, which, in the case of collagen, facilitates above all enzyme attack, but also improves the ease of scouring (see "Library of Leather," Volume 2, edited by H. Herfeld (1989), p. 63, and Y. Nozak, Ch. Tanford in J. Biol. Chem., 238 (1963), pp. 4075–4081).

In liming, the effect of the hydrotropes can be discerned in the loosening of the hair and the hide.

The use of hydrotropes in the enzymatic hydrolysis of various soluble and insoluble proteins is described in several patents. Hydrotropes, particularly urea, facilitate proteolytic attack by denaturing the protein to be hydrolyzed. German Patent No. P 2,643,012 describes the proteolytic hydrolysis of mechanical hide scrapings in the presence of urea; German Patent No. 2,705,669, the hydrolysis of wool and hair; German Patent No. P 2,756,739, the hydrolysis of flesh wastes; and German Patent No. P 2,842,918, the hydrolysis of proteins from blood. In these patents, the content of urea in the hydrolysis batch is consciously limited to <1 mol/L, preferably <0.1 mol/L, in order to prevent the enzyme protein itself from being denatured and losing its activity. The threshold for an effective impairment of the protein activity is therefore set above 1 mol/L urea. Thus, there are considerable reservations in adding urea in high concentration to a liquid preparation that contains enzymes. Enzymatic liquid preparations that contain urea or other hydrotropes are not known.

The same is true for German Patent No. 2,813,075. Here an enzymatic liming process is described, in which urea or guanidine hydrochloride is added to the bath in addition to alkaline proteinase. The content of hydrotrope in the bath is below 1%. It is added separately from the enzyme preparation.

Other additives in the processing of leather in the beamhouse include surface-active substances, such as conventional emulsifiers. They are supposed to disperse the grease adhering to the skin and in this way, to clean the surface of the skin. The relevant state of the art has been described in detail, for example, in European Patent Application No. 0,505,920. Nonionic emulsifiers, such as polyglycol derivatives and glycerol derivatives, are mentioned, as well as anionic emulsifiers, such as alkyl or aryl sulfates and sulfonates, and amine salts and quaternary ammonium salts. They all have in common an HLB value of 8–18, preferably 9–15, especially 12–15. Also combinations of various emulsifier types are described in the above European patent application.

Other additives to the bath during the processing of leather in the beamhouse are lime-dispersing or lime-dissolving agents, also called sequestering agents, which are used for surface cleaning the skin to remove undesired deposits or are supposed to prevent the formation of lime soaps. Sequestering agents are, for example, polyphosphates, polyphosphonates, polycarboxylates, ethylenediaminetetraacetic acid (EDTA), nitrilotriacetic acid, diethylenetriaminepentaacetic acid and salts of the latter.

Hair-loosening agents are also added to the bath during the working step of the liming. In addition to alkalizing additives, they are, above all, thio compounds, such as sodium mercaptoethanol or hydroxyfunctional amines, such as mono-, di-, or triethanolamine. The latter also have a pronounced swelling-inhibiting effect; that is, the skins exhibit less swelling and thus less scar contraction with the action of the alkali in the liming.

All of the above additives to the bath are conventional and are individually added to the bath. Combination preparations with enzymes are not common.

The stabilization of enzyme preparations

The use of molasses as a stabilization agent for liquid enzyme preparations is not known. The aesthetic aspects alone, namely, the increasingly dark color and the related color changes in the treated product, are an argument against the use of molasses in an enzyme preparation for food technology. Also, the nonstandardizable composition and above all, the undefined thermal degradation products contained in the molasses, which could act to reduce activity, induce the specialist to refrain from using it. On the other hand, molasses is frequently used for the fermentation of microorganisms as a C source. M. Bekers and A. Upit in mikrobiologiya, 41 (5), pp. 830–833 (1972), report a stabilization effect of yeast fermented with molasses on its viability as a dry product. In U.S. Pat. No. 4,201,564, molasses is added to a fertilizer as a C source and thus as a stabilizer for good, continuous growth of soil bacteria. The state of the art would not, in any way, suggest the use of molasses in a liquid enzyme preparation.

On the other hand, the use of different carbohydrates and other polyols of a defined composition as a stabilizing agent in liquid enzyme preparations is known in the art. European Patent Application No. 74,237 describes the use of sorbitol to stabilize lactase solutions. U.S. Pat. No. 4,011,169, very generally describes the use of polysaccharides for the formulation of enzyme preparations. U.S. Pat. No. 3,133,001 mentions, sucrose, lactose, and maltose, among others as stabilizers. Japanese Patent No. 262,339 also proposes alcohols to stabilize liquid preparations, particularly proteinases. The use of dissolved carbohydrates as a carrier liquid in enzymatic leather treatment agents has not been described up to now. Enzymatic preparations in which carbohydrates are combined with other additives, such as hydrotropes, sequestering agents, surfactants, or hair-loosening agents, are not known. Finally, Swiss Patent No. 677,798 claims a liquid formulation of enzymes for technical use, for example, in the leather industry. The preparations described here essentially contain anhydrous, organic liquids and inorganic, powdery dispersants.

SUMMARY OF THE PRESENT INVENTION

Accordingly, one object of the present invention is to provide an aqueous liquid composition for use in the production of leather in a beamhouse which contains a combination of proteolytic and/or lipolytic enzymes and is microbiologically stable and has high levels of activity constancy.

A further object of the present invention is to provide a stable, aqueous liquid composition which is a combination preparation which improves rehydration and dirt removal in the soaking process during production of leather.

A further object of the present invention is to provide a stable, aqueous liquid composition which is a combination preparation which improves loosening of hair and inhibits swelling during liming.

Another object of the present invention is to provide a stable, aqueous liquid composition which is a combination preparation which improves cleaning of the surface of the skin during bating.

Another object of the present invention is to provide a stable, aqueous liquid composition which is a combination preparation which can be used in multiple stages of leather preparation.

These and other objects of the present invention have been satisfied by the discovery of an aqueous liquid composition for use in processing of skins and hides in a beamhouse, comprising one or more enzymatic active substances and at least 10 wt % to a maximum (100–x) wt % molasses, wherein x is the fraction of enzymatic active substances in wt % and wherein x is a value from 0.001 to 90.

DETAILED DESCRIPTION OF THE PREFERRED EMBODIMENTS

The present invention relates to an aqueous liquid composition for the processing of skins and hides in the beamhouse, comprising enzymatic active substances which is characterized by the fact that it contains at least 10 wt % to a maximum (100–x) wt % molasses, wherein x is the fraction of enzymatic active substances in wt %, wherein x can be in the range from 0.001 to 90 wt %. Preferably, the quantity of enzymatic active substances lies at 0.1 to 10 wt %.

If the individual use permits it, enzyme preparations are preferably offered in aqueous, liquid form. The liquid form corresponds to the standard milieu of the enzyme reaction, the aqueous medium. Therefore, aqueous, liquid enzyme preparations are quickly and directly applied. In comparison to lyophilized enzyme preparations, the dissolution process, which can be tedious, is omitted. Also allergic contact reactions, which can appear when using lyophilized enzyme preparations (particularly if they contain dust) can be easily ruled out. Liquid enzyme preparations are also advantageous with continuous enzyme dosage.

On the other hand, one is confronted with a number of problems when using liquid enzyme preparations. First, the stability of such preparations, in two respects:

1. Microbiological stability

An enzyme preparation that is to have a service life of one year and longer should not be subjected to a microbial attack during this time. This danger exists due to the composition of the preparation, since mostly it contains the necessary components of a nutrient solution for microorganisms. Microbial growth can be prevented by various preservatives. Very small addition amounts, <1% as a rule, are sufficient. A compilation of conventional preservatives can be found in K. H. Wallhaeusser, Sterilization, Disinfection, Preservation, Georg Thieme Verlag, 1978, p. 380. Preservatives are not an absolutely reliable agent to fend off any microbial growth; moreover, they often harm the enzyme. Therefore, the alternative for a microbial stabilization, as low as possible an activity of water in the preparation, is mostly preferred. The lower the water content, the less, the danger of microbial growth due to the high osmotic pressure. Therefore, enzyme preparations are mostly formulated in such a way that they contain high concentrations of water-soluble compounds of all kinds: salts, carbohydrates, such as sugars, and other polyhydroxy compounds, such as glycerol.

2. Activity constancy

In aqueous solution, enzymes are subjected to the influence of any other components of the medium, such as acids, bases, salts, surface-active and complex-active components, other macromolecules, and, above all, other enzymes. These components can have both a stabilizing as well as a destabilizing effect. The mechanisms of destabilization are complex. They can be thermal, chemical, or proteolytic in nature. No general statement can be made as to which stabilization agents mentioned in the literature work in a particular application case and which do not. An agent can, on the one hand, stabilize a certain enzyme and, on the other hand, destabilize another enzyme (see Torchlin, Martinek, Enzyme Microb. Technol., 1979, Vol. 1, p. 74). This makes difficult the goal of finding a suitable stabilizing agent for an enzyme formulation.

In the formulation of the carrier liquid, the goal of the invention is to use a cost-effective, sufficiently available, as well as readily biodegradable and environmentally friendly stabilizing agent. It should be readily soluble in water so that it can be used in high concentration.

Another goal of the invention is the combination of various functions of leather production in one liquid combination preparation. According to the state of the art, the ingredients for the mostly comprehensive recipe of a bath are, for the most part, added individually. Here work expenditure is great and the danger of dosage mistakes is high.

All measures that help to simplify this method and to reduce the number of agents to be added represent progress in comparison to the state of the art.

To combine several functions of leather treatment in one agent without impairing the effect of the individual components thereby involves considerable difficulties. Particular attention has to be given to the enzyme activity, for it is precisely enzymes which react in a particularly sensitive manner to components in the carrier liquid. Two main points for the incorporation of active substances other than enzymes concern hydrotropes and other hair-loosening agents.

Molasses is a replenishable raw material, is biodegradable, and is very cost-effective as a waste substance. It is the syrup-like, dark-brown residue of sugar production which can no longer be brought to crystallization (see Kirk-othmer, Encyclopedia of Chemical Technology, 3rd Edition, Vol. 22, J. Wiley, 1985, pp. 514–517). Molasses from cane sugar contains 30–40% sucrose, 15–25% invert sugar, up to 5% aconitic acid, and hardly any betaines. The water content is 30–40%.

According to *Römpp Chemie Lexikon* [[*Römpp's Chemical Directory*] (9th Edition, G. Thieme Verlag, 1991), molasses from beet sugar contains, on the average, 50% sucrose, 20% nonsugar matter (dextrins, betaines, lactic acid), 2% nitrogen compounds, 1% invert sugar, and rare sugars, such as raffinose and kestose, and 23% water. Often the concentration of the components is less. The water content then lies considerably higher, up to 35%.

Molasses is very viscous, but it can nevertheless be used alone as a carrier liquid for enzymes. For the production of such a preparation, the enzyme, which can be liquid or solid, must be dissolved directly in the molasses. If, as an exception, enzymes are available pure, they can be worked in, as such, into the molasses. In this case, quantities of 0.001 to 0.1 wt % enzyme suffice; the rest is molasses. Mostly, enzymes with different carrier substances are blended or dissolved in carrier liquids. They must be put up with in the formulation of the leather treatment preparation in accordance with the invention; they thus become a component of the liquid agent. The additional amounts of enzymatic active substance then lie in the range of 0.1 to 10 wt %; however, they can also be up to 90 wt % of the preparation in accordance with the invention.

In the majority of cases, water is added to the molasses in order to produce a less viscous liquid preparation. Even if other active substances are added, they often must be dissolved beforehand in water, so that the end content of molasses is inevitably lower. Although molasses is the main carrier liquid of the preparation in accordance with the invention, in most cases, it may be contained in a relatively low concentration; in the extreme case, at only 10%. Preferably, however, it is contained in the preparation at 50 to 80%. The remaining 25 to 50% consists mostly of other ingredients, such as enzymes, various active substances, and water.

Surprisingly, it was discovered that molasses is an excellent stabilizer for the enzyme activities contained in the preparation. That is true when the activity is obtained immediately after the formulation of the liquid preparation as well as with its storage over a longer period of time, such as 6 months. In the best of cases, one would have expected a stabilization effect that corresponds to the sugar content contained in the molasses. Stabilization effects which are predominantly based on the reduction of the water activity are known from sugars, such as sucrose. However, molasses has a stabilization effect that goes beyond the sugar content and is probably based on the presence of other non-sugar-like components. The use of molasses as a carrier liquid in enzyme preparations is thus an essential characteristic of the present invention.

Conventional enzymes, such as those described above in "Discussion of the Background", can be incorporated into the present composition. From the large number of available proteases, lipases, amylases and also other hydrolases, which should be included here, the enzyme can be selected freely with respect to quantity and type. For the proteases, the pancreas enzymes, which are actually an enzyme mixture, proteases from *Bacillus subtilis* and *B. licheniformis*, and Aspergillus proteases are preferred. For lipases, the highly alkaline *Aspergillus oryzae* lipases obtained by means of genetic engineering are preferred. The selection of the enzyme species, of course, depends on the intended area of usage. If the liquid is to be used preferably in bating, proteases or lipases which have their pH optima in the neutral to weakly alkaline pH range are selected. For a more universal application, namely for use also in liming and soaking, it is preferable to use enzymes with a pH optimum of 9 and above. The use of proteases or lipases with a pH optimum ≧9 is a preferred specific embodiment of the invention. Using the present-day state of the art, the enzymes contained in the liquid in accordance with the invention also contain various different enzyme activities, preferably mixtures of proteases with lipases, wherein both can have pH optima of ≧9, as described in West German Patent Nos. A 3,922,748 and A 4,109,826. It was surprisingly discovered that in enzyme mixtures in the presence of molasses, the protease attacks other enzymes less, and in protease solutions, the feared self-digestion effect is extensively suppressed.

Proteolytic enzymes are preferred to have an activity of 100 to 20,000 LVE/g in the present preparation. The lipases are preferred to have an activity of 10–1000 lipase units/g according to FIP.

Another preferred characteristic of the invention under consideration is the content of hydrotropes in the liquid preparation. Hydrotropes such as urea have a denaturing effect on proteins in higher concentrations. For this reason, a threshold value of ≧1 mol/L urea (=60 g/L=6 wt %) for an activity-damaging influence of the enzyme is found in the literature. In the invention under consideration, the content of hydrotrope in the molasses-containing liquid preparation can also be clearly higher, namely from 3 to 40 wt %, preferably from 10 to 20%. Surprisingly, activity loss was not observed even with higher additional quantities of hydrotrope. The correspondingly formulated liquid products are stable with respect to activity even after storage. With regard to the selection of the hydrotrope, as with the enzyme species, any conventional hydrotropic compound can be used. Urea, guanidine hydrochloride, cumensulfonate, and calcium chloride are particularly preferred.

Finally, the liquid product in accordance with the invention can also contain other active substances with dispersing, swelling-inhibiting, hair-loosening, and lime-dissolving activity. In this case also, it was surprising not to observe any activity losses of the enzyme content. These additional active substances can be used in quantities of from 0.1 to 20 wt %.

With regard to the selection of these additives, any conventional additives can be used, such as those described above. As representatives of the large possible number of active substances, one can mention here polyphosphates as an example of a lime-dissolving agent, sodium mercaptoethanol and thioglycolic acid, as a hair-loosening agent, alkanesulfonates and alkyl polyglycol ethers as a dispersant, and hydroxyfunctional amines as a swelling-inhibiting agent.

These active substances can be added individually to the molasses-containing enzyme product, or can be mixed with a hydrotrope or several hydrotropes, and also can be used in any arbitrary mixture of active substances.

A pH value that is detrimental to the activity of the enzyme, under certain circumstances, could be established in the aqueous solution by the various additives. This is generally true for pH values above 12 and below 4. Since the acid and alkali stability of the individually used enzymes are known, the pH value should be correspondingly adapted. Thus, for example, for Bacillus proteases, a weakly alkaline pH value (pH=7–9) is selected in the liquid product, and a pH value below 5 is avoided. In the majority of cases, a pH value between 7 and 9 is advantageous for the enzyme activity. The adjustment of the pH value by the addition of acids, alkalis, or buffers appropriately takes place before the addition of the enzymes, so as not to subject them to an extreme pH load.

The water content in the liquid product in accordance with the invention usually lies from 20 to 80 wt %, preferably, at from 25 to 50 wt %. The stabilizing effect of the molasses asserts itself particularly with low water contents or high solids contents. A high solids content need not result only from the components of the molasses but also from the other active substances, which can lie even higher in content, under certain circumstances, than the components of the molasses. In a majority of cases, however, the latter predominate. Usually, all components of the liquid products are dissolved. However, it is also possible to disperse water-insoluble additives in the molasses solution, if the viscosity is high, and in this way, a settling of the dispersion can be prevented to a large extent. To increase the solids fraction in the liquid preparation, salts, such as sodium chloride, ammonium or sodium sulfate, and also other readily water-soluble substances, such as carbohydrates, amino acids, or proteins, can also be added. Their fraction in the preparation should not exceed 20 wt % in the majority of cases.

The high solids content and the low water activity are not only important criteria for activity stability but also for microbial stability. It is mostly present with solids content over 50 wt %. Nevertheless, a conventional preservative in the usual amount, preferably <1%, can also be readily added to the liquid preparation. That is recommendable in any case if the water content in the preparation is high, for example, with water contents over 80%.

The use of the liquid product in accordance with the invention generally takes place before the individual operation of the leather processing by addition to the bath. The present composition is added in quantities of from 0.1 to 5 wt %, based on the skin weight, preferably from 0.5 to 2%.

Having generally described this invention, a further understanding can be obtained by reference to certain specific examples which are provided herein for purposes of illustration only and are not intended to be limiting unless otherwise specified.

EXAMPLES

Enzyme preparations 1–15 in accordance with the invention were prepared to show that:

1. the use of molasses leads to a higher enzyme stability than sucrose with approximately the same solids content, and
2. the various additives, such as urea (hydrotrope), mercaptoethanol sodium salt (hair-loosening agent), diethanolamine as a swelling-inhibiting and lime-dispersing agent, do not have any activity-reducing influence or have only a subordinate one (see Table I).

The products were produced according to the following instructions:

A part of the needed water, stabilizer (molasses and as a comparison, sucrose), and the corresponding additives (hydrotropes, dispersants, emulsifiers, dehairing agents, swelling-inhibiting substances, etc.) were stirred to homogeneity. The pH value of the solution was adjusted to a value of approximately 7 with 2% NaOH or 10% formic acid. To prevent the uncontrolled growth of microorganisms, 0.1% of a preservative based on p-chloro-m-cresol and an isothiazolinone derivative (Mergal KM 80 from Riedel de Haen) were added. Subsequently, the enzyme (alkaline protease from *Bacillus subtilis*, pancreatin, lipase from *Aspergillus oryzae*, fungal protease from *Aspez.gillus sojae*) was added. Advantageously, the enzyme was dissolved beforehand in a small amount of water. The enzyme quantity was measured in such a way that with proteases, a theoretical starting activity of 1000 LVE/g resulted, and with lipases, an activity of 100 FIP units/g (pH=9). The added quantities of enzyme were controlled to lie absolutely below 1 wt %. Finally, water was added to make up 100 parts by weight (=wt %). Note: The added molasses was a sugar beet molasses with a sugar fraction of approximately 40% sucrose and a water content of 33%. Similar results were obtained with molasses with a sugar content of 50% and a water content of 25%.

Stability tests

The protease initial enzyme activity of the freshly prepared enzyme preparation was immediately measured. The sample was subsequently stored at 45° C. for 7 days; then, the enzyme activity was once again determined. The activity decline of the proteases so measured corresponded, like the model, to a storage of the enzyme preparation of 9 months at room temperature. Lipases were mostly even more stable.

The results are summarized in Table I. They show that molasses stabilized the enzyme activity better than pure sucrose with the same solids content. It should be noted here that even better stability characteristics are attained with regard to protease activities if instead of 60 parts, 75 parts molasses of the aforementioned composition are used.

TABLE I

| Enzyme type | Parts by weight stabilizer | Parts by weight additive 2 | Parts by weight additive 3 | Activity decline (%) |
|---|---|---|---|---|
| 1 Alkaline bacterial protease | 60 parts molasses | | | 0.9 |
| 2 Alkaline bacterial protease | 60 parts molasses | 15 parts urea | | 2.1 |
| 3 Alkaline bacterial protease | 40 parts sucrose | | | 58.0 |
| 4 Alkaline bacterial protease | 40 parts sucrose | 15 parts urea | | 28.6 |
| 5 Alkaline bacterial protease | 60 parts molasses | 10 parts mercaptoethanol 1 Na salt | | 10.3 |
| 6 Alkaline bacterial protease | 60 parts molasses | 10 parts diethanolamine | | 6.9 |
| 7 Alkaline bacterial protease | 60 parts molasses | 10 parts sulfonated oleic acid | | 7.8 |
| 8 Pancreas enzyme | 60 parts molasses | | | 66 |
| 9 Pancreas enzyme | 40 parts sucrose | | | 77 |
| 10 Fungal protease | 60 parts molasses | | | 46 |
| 11 Fungal protease | 40 parts sucrose | | | 49 |
| 12 Alkaline lipase | 60 parts molasses | | | 2.9 |
| 13 Alkaline lipase | 40 parts sucrose | | | 19.6 |
| 14 Alkaline bacterial protease | 60 parts molasses | 10 parts mercaptoethanol 1 Na salt | 10 parts diethanolamine | 11.5 |
| 15 Alkaline bacterial protease | 60 parts molasses | 15 parts urea | 20 parts sulfonated oleic acid | 13.5 |

What is claimed as new and is desired to be secured by Letters Patent of the United States is:

1. An aqueous liquid composition for use in processing of skins and hides in a beamhouse, comprising one or more enzymatic active substances and at least 10 wt % to a maximum of (100–x) wt % molasses, wherein x is the fraction of enzymatic active substances in wt % and wherein x is a value from 0.001 to 90.

2. The aqueous liquid composition as claimed in claim 1, wherein molasses is contained in an amount of from 50 to 80 wt %.

3. The aqueous liquid composition according to claim 1, wherein the molasses is sugarbeet molasses.

4. The aqueous liquid composition according to claim 1, further comprising 3 to 40 wt. % of hydrotropes.

5. The aqueous liquid composition according to claim 4, further comprising one or more hydrotropes selected from the group consisting of urea, guanidine hydrochloride, cumenesulfonate and calcium chloride.

6. The aqueous liquid composition according to claim 4, which contains from about 10 to 20 wt % of said hydrotropes.

7. The aqueous liquid composition according to claim 1, further comprising one or more additional active substances selected from the group consisting of swelling-inhibitors, hair-looseners and lime-dissolvers.

8. The aqueous liquid composition according to claim 7, wherein said lime-dissolver is a polyphosphate.

9. The aqueous liquid composition according to claim 7, wherein said hair-loosener is selected from the group consisting of mercaptoethanol and thioglycolic acid.

10. The aqueous liquid composition according to claim 7, wherein said swelling-inhibitor is a hydroxy functional amine.

11. The aqueous liquid composition according to claim 1, wherein said composition has a water content of from 20 to 80 wt %.

12. The aqueous liquid composition according to claim 11, wherein said water content is from 25 to 50 wt %.

13. The aqueous liquid composition according to claim 1, wherein said enzymatic active substance exhibits proteolytic activities.

14. The aqueous liquid composition according to claim 13, wherein said proteolytic activity comes from a bacterial protease with a pH optimum of >9.

15. The aqueous liquid composition according to claim 13, wherein said proteolytic activity is from 100 to 20,000 LVE/g.

16. The aqueous liquid composition according to claim 1, wherein said enzymatic active substance exhibits lipolytic activities.

17. The aqueous liquid composition according to claim 16, wherein said lipolytic activity comes from a lipase with a pH optimum of >9.

18. The aqueous liquid composition according to claim 1, wherein said one or more enzymatic active substances exhibit lipolytic and proteolytic activities.

19. The aqueous liquid composition according to claim 1, wherein said enzymatic active substances are present in an amount of from about 0.1 to 10 wt. %.

20. A method for processing skins and hides in a beamhouse, comprising contacting a skin or hide in need thereof with from 0.1 to 5 wt %, based on skin or hide weight, of an aqueous liquid composition comprising one or more enzymatic active substances and at least 10 wt % to a maximum of (100–x) wt % molasses, wherein x is the fraction of enzymatic active substances in wt %, based on the composition weight, and wherein x is a value from 0.001 to 90.

21. The method of claim 20, wherein said skin or hide is contacted with from 0.5 to 2 wt %, based on the skin weight of said aqueous liquid composition.

* * * * *